United States Patent [19]

Fukuda

[11] Patent Number: 5,107,257

[45] Date of Patent: Apr. 21, 1992

[54] BUS RELAY APPARATUS FOR MULTI-DATA COMMUNICATION PROCESSING SYSTEM

[75] Inventor: Takuma Fukuda, Tokyo, Japan

[73] Assignee: NEC Corporation, Tokyo, Japan

[21] Appl. No.: 523,730

[22] Filed: May 15, 1990

[30] Foreign Application Priority Data

May 17, 1989 [JP] Japan ................................ 1-125014

[51] Int. Cl.$^5$ ............................................. H04Q 1/00
[52] U.S. Cl. ............................. 340/825.08; 340/825.5; 370/85.8
[58] Field of Search ................. 340/825.08, 825.18, 340/825.47, 825.5, 825.05; 370/85.8, 95.2, 85.6, 85.13

[56] References Cited

U.S. PATENT DOCUMENTS

| | | | |
|---|---|---|---|
| 4,569,047 | 2/1986 | Aimura | 340/825.08 |
| 4,679,192 | 7/1987 | Vanbrabant | 340/825.08 |
| 4,750,114 | 6/1988 | Hirtle | 340/825.05 |
| 4,787,082 | 11/1988 | Delaney et al. | 370/85.1 |
| 4,860,006 | 8/1989 | Barall | 340/825.5 |

*Primary Examiner*—Donald J. Yusko
*Assistant Examiner*—Edwin C. Holloway, III
*Attorney, Agent, or Firm*—Helfgott & Karas

[57] ABSTRACT

A bus relay apparatus includes a counting unit and a switching unit. The counting unit counts polling signals transmitted from a bus controller present in a first group of a plurality of grouped data communication processors. The switching unit switches a bus direction in accordance with the count of the counting unit.

1 Claim, 3 Drawing Sheets

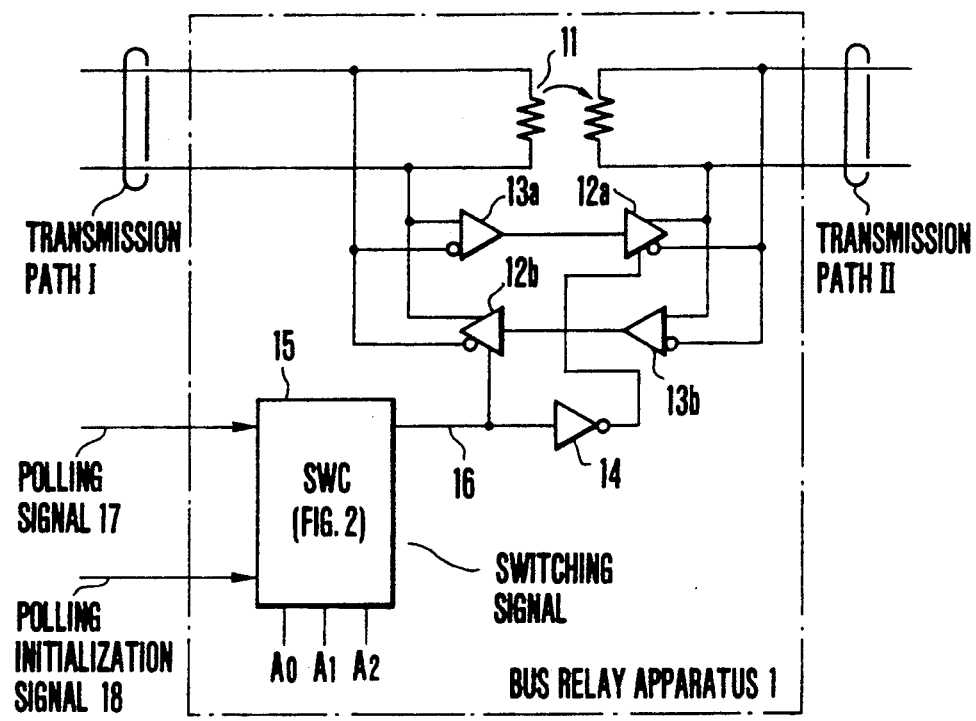
F I G. 1
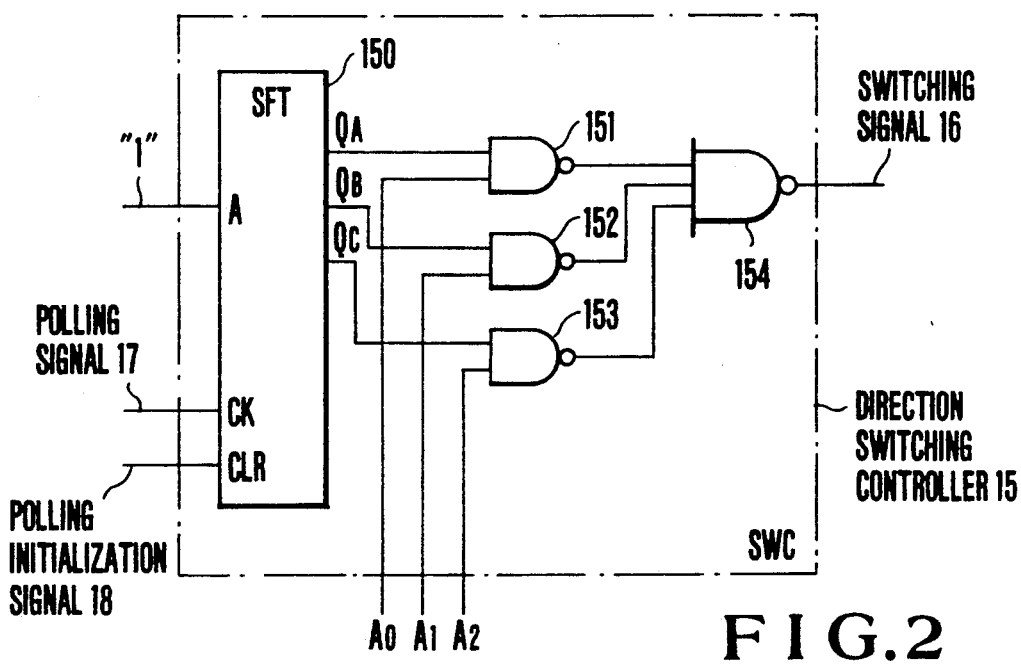
F I G. 2

BUS RELAY APPARATUS FOR MULTI-DATA COMMUNICATION PROCESSING SYSTEM

BACKGROUND OF THE INVENTION

The present invention relates to a bus relay apparatus and, more particularly, to a bus relay apparatus for use in a multi data communication processing system, for dividing data communication processors into several groups and performing a polling operation in units of groups, thereby performing communication between relay apparatuses.

A conventional relay apparatus of this type has input and output ports and relays an address received at the input port to the output port. In this case, the direction of a bus is determined by a signal line and independent from a polling signal.

In the above conventional relay apparatus, since direction control of a signal line is performed independently of a polling signal, buses must be looped.

SUMMARY OF THE INVENTION

It is an object of the present invention to provide a bus relay apparatus capable of performing data communication without using a loop-like bus arrangement.

In order to achieve the above object of the present invention, there is provided a bus relay apparatus for use in a multi data communication system in which a plurality of data communication processors are grouped and each data communication processor is connected to another data communication processor belonging to a different group via a relay apparatus, comprising counting means for counting polling signals transmitted from a bus controller present in a first group, and switching means for switching a bus direction in accordance with the count of the counting means.

BRIEF DESCRIPTION OF THE DRAWINGS

FIG. 1 is a circuit diagram showing an embodiment of a bus relay apparatus according to the present invention;

FIG. 2 is a circuit diagram showing an arrangement of a direction switching controller;

DETAILED DESCRIPTION OF THE PREFERRED EMBODIMENT

The present invention will be described in detail below with reference to the accompanying drawings.

Figure 3:
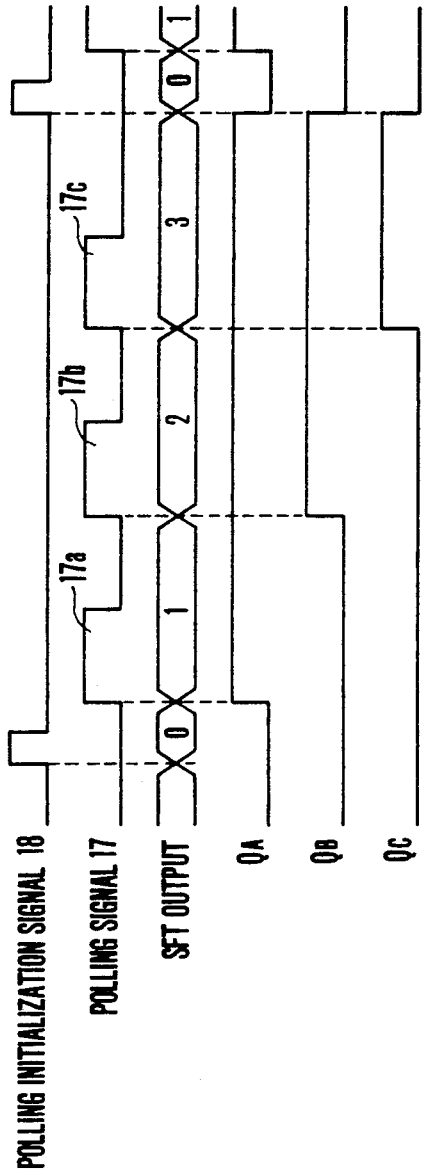
FIG. 3 is a timing chart for explaining a direction switching operation in FIG. 2.
Figure 4:
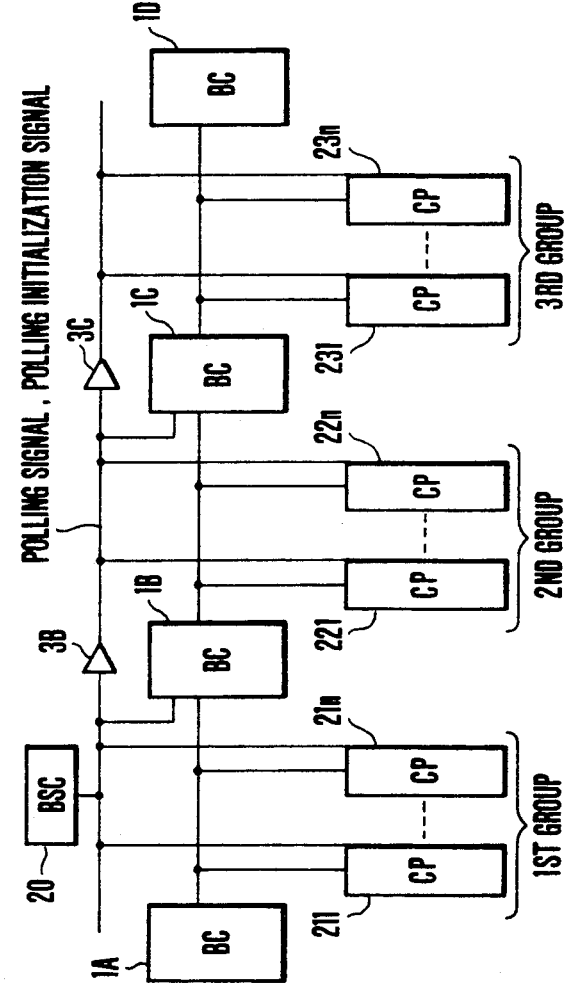
FIG. 4 is a block diagram showing a multi data communication processing system using the bus relay apparatus shown in FIG. 1.
Figures 5, 6A, 6B, 6C:
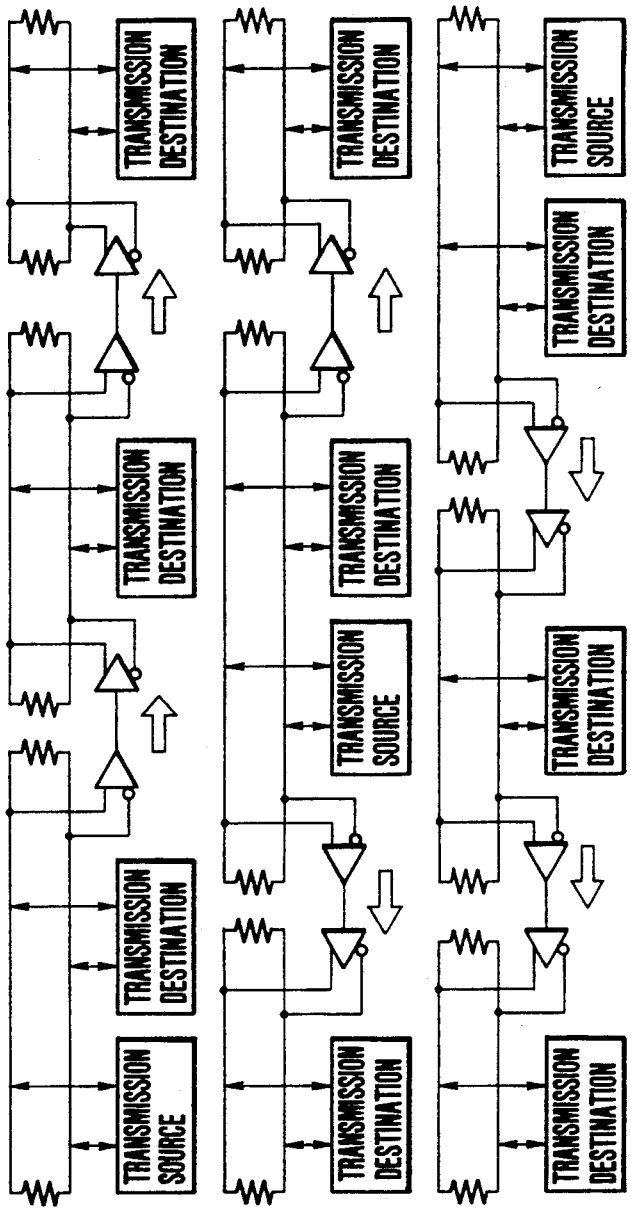
FIG. 5 is a view showing addresses of the bus relay apparatuses shown in FIG. 4.
FIGS. 6A to 6C are views for explaining a data communication operation in FIG. 4.

FIG. 1 shows an embodiment of a bus relay apparatus according to the present invention, FIG. 2 shows an arrangement of a direction switching controller shown in FIG. 1, FIG. 3 shows signal waveforms for explaining a direction switching operation in FIG. 2, FIG. 4 shows an arrangement of a multi data communication processing system using the bus relay apparatus shown in FIG. 1, FIG. 5 shows addresses of the bus relay apparatuses shown in FIG. 4, and FIGS. 6A to 6B show a data communication operation.

Referring to FIG. 1, transmission paths I and II are relayed by a bus relay apparatus (to be referred to as a BC hereinafter) 1. The BC 1 comprises terminal resistors 11 of the transmission paths I and II, a cable receiver 13a and a cable driver 12a for transmitting data from the transmission path I to the transmission path II, a cable receiver 13b and a cable driver 12b for transmitting data from the transmission path II to the transmission path I, and a direction switching controller (to be referred to as an SWC hereinafter) 15 for generating a switching signal 16 for designating a relay data transfer direction between the transmission paths I and II. Upon initialization of an internal circuit by a polling initialization signal 18, the SWC 15 generates the switching signal 16 in accordance with a count obtained by a polling signal 17 and activates or deactivates enable signals of the cable drivers 12a and 12b, thereby designating a data transfer direction.

A multi data communication processing system shown in FIG. 4 is grouped into a first group of data communication processors (to be referred to as CPs hereinafter) 211 to 21n, a second group of CPs 221 to 22n, and a third group of CPs 231 to 23n. BCs 1B and 1C are located between neighboring groups, and a bus controller (to be referred to as a BSC hereinafter) 20 located between BCs 1A and 1B transmits a polling initialization signal and a polling signal. The two signals are supplied from the BSC to the data communication processors 221 to 22n via direction-fixed relays 3B and 3C.

As shown in FIG. 2, the SWC 15 shown in FIG. 1 comprises a shifter (to be referred to as an SFT hereinafter) 150, selection gates 151, 152, and 153 for generating a switching signal, and a direction switching signal 154. A polling operation is performed in units of groups such that the first, second, and third groups are polled in first, second, and third polling operations, respectively.

A basic operation of group polling will be described below.

This method is used to group a plurality of data communication processors CP and perform a polling operation in units of groups, thereby equally giving an opportunity of bus arbitration in units of groups.

In group polling according to this method, the BSC 20 for performing bus arbitration and bus monitoring transmits a polling signal to each data communication controller CP.

Each data communication controller CP performs the following arbitration operation.

1) Each data communication controller CP counts polling signals and fetches only a polling signal directed to a designated group.

2) A data communication controller CP having a bus request sets the level of a specific data line to HIGH if no data communication controller having a higher priority order than itself has a bus request at the leading edge of the polling signal.

3) If any data communication controller having a higher priority order has a bus request, the data communication controller CP having a bus request holds its bus request.

After sending the polling signal, the BSC 20 checks at the trailing edge of the polling signal whether only one data communication controller is selected.

If only one data communication controller is selected, the BSC 20 stops transmission of the polling signal and permits the use of a bus.

The selected data communication controller sets the level of BUSY indicating the use of a bus to HIGH to execute a sequence operation of the bus and sets it to LOW to acknowledge the end of the bus operation to the BSC 20.

When BUSY goes to LOW level, the BSC 20 restarts transmission of the polling signal.

The bus arbitration operation is performed by the above method.

The bus relay apparatus of the present invention is located between the grouped data communication controllers and counts the number of the polling signals to control the direction of the bus relay apparatus from a master to a slave.

In this case, the same SFT 150 is used for each of the BCs 1A to 1D shown in FIG. 4. Outputs $Q_A$, $Q_B$, and $Q_C$ from each SFT 150, however, are controlled by addresses $A_0$, $A_1$, and $A_2$ set by an associated BC. The addresses $A_0$ to $A_2$ are set by a switch provided in each BC. The polling signal 17 and the polling initialization signal 18 supplied to the SFT 150 shown in FIG. 2 are output from the BSC 20 shown in FIG. 4. A signal supplied to a terminal A of the SFT 150 is constantly at HIGH level.

The polling signal 17 transmitted from the BSC 20 is supplied to a terminal CK of the SFT 150 of each BC, and the SFT 150 operates as shown in FIG. 3 in accordance with the number of the polling signals.

The output 16 shown in FIG. 2 is windowed by the addresses $A_0$ to $A_2$ set in each BC.

A direction switching control operation of the bus relay apparatus will be described below with reference to FIGS. 2 to 6C.

First, the SFT 150 is initialized by the polling initialization signal shown 18 in the timing chart of FIG. 3. When a polling signal 17a is input, the output $Q_A$ of the SFT 150 is generated. When polling signals 17b and 17c are input, the outputs $Q_B$ and $Q_C$ are generated. The addresses $A_0$, $A_1$, and $A_2$ shown in FIG. 2 are set beforehand as shown in, e.g., FIG. 5 by the direction switching selection gates 151, 152, and 153, respectively. Referring to FIG. 5, when "1" is set in the address, direction switching is effective. When the output $Q_B$ from the SFT 150 is "1", i.e., when the second polling signal 17 is output, the direction of the BC 1B shown in FIG. 4 is switched. This direction switching state is shown in FIG. 6B. Similarly, when the output $Q_C$ from the SFT 150 is "1", i.e., when the third polling signal 17 is output, the direction of the BC 1C shown in FIG. 2 is switched. This direction switching state is shown in FIG. 6C. A CP which generates a bus access request upon group polling obtains access to the bus and sends a transmission destination address. The BC performs direction control so that all of the CPs can receive the transmission destination address. Since a transmission source CP is present in the first group when the first polling signal is output, direction control is performed as indicated by an arrow shown in FIG. 6A. In the second polling operation, since a transmission source CP is present in the second group, direction control is performed as indicated by an arrow shown in FIG. 6B. In the third polling operation, since a transmission source CP is present in the third group, direction control is performed as indicated by an arrow shown in FIG. 6C. By this direction control performed by the BC, a data communication operation is performed between a transmission source and a transmission destination as shown in FIGS. 6A to 6C. In accordance with the number of polling signals, the bus direction of the relay apparatuses is switched in the order of BC 1B→BC 1C→BC 1D→BC 1B.

As has been described above, the present invention effectively uses a polling signal to control the bus direction of relay apparatuses, thereby performing data communication without using a loop-like bus arrangement.

What is claimed is;

1. A bus relay apparatus for use in a multi data communication system in which a plurality of data communication processors are grouped and each data communication processor is connected to another data communication processor belonging to a different group via a bus relay apparatus, a bus controller being present in a first group for performing a bus arbitration operation and outputting polling signals, the bus relay apparatus comprising:
   counting means for counting said polling signals transmitted from said bus controller; and
   bus direction control means connected to said counting means and generating a switching signal in accordance with the count of said counting means for switching a bus direction of the bus relay apparatus and thereby performing data communication in said system without using a loop-like bus arrangement.

* * * * *